Jan. 10, 1967  F. J. VON DELDEN  3,297,928
ELECTRIC MOTORS INCLUDING PLURAL SETS OF WINDING SWITCHES
Filed Dec. 21, 1964
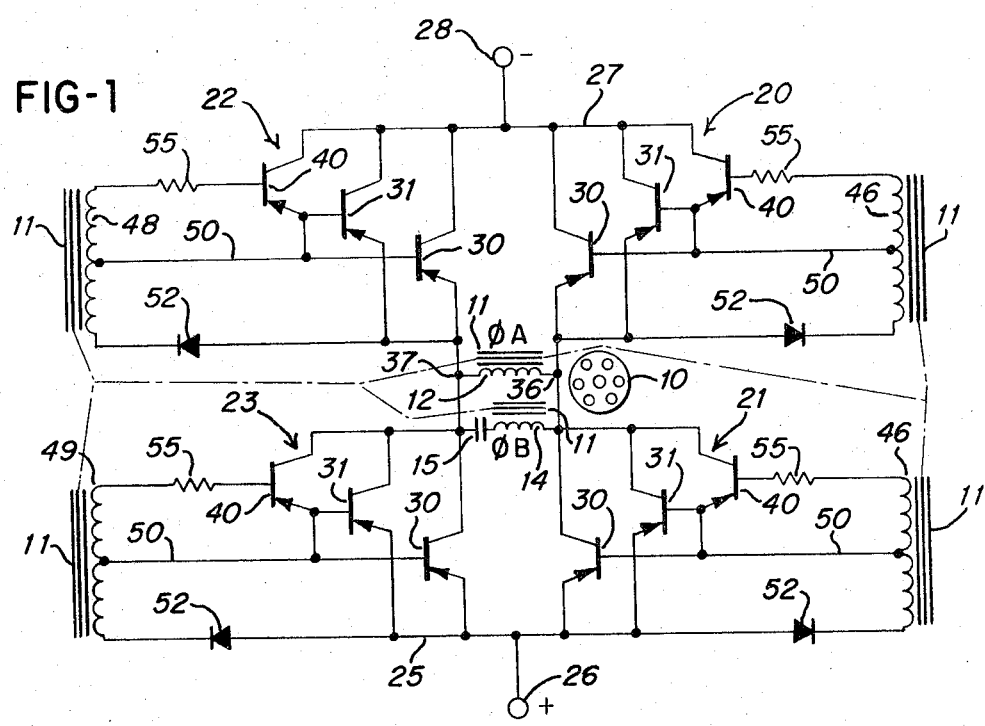
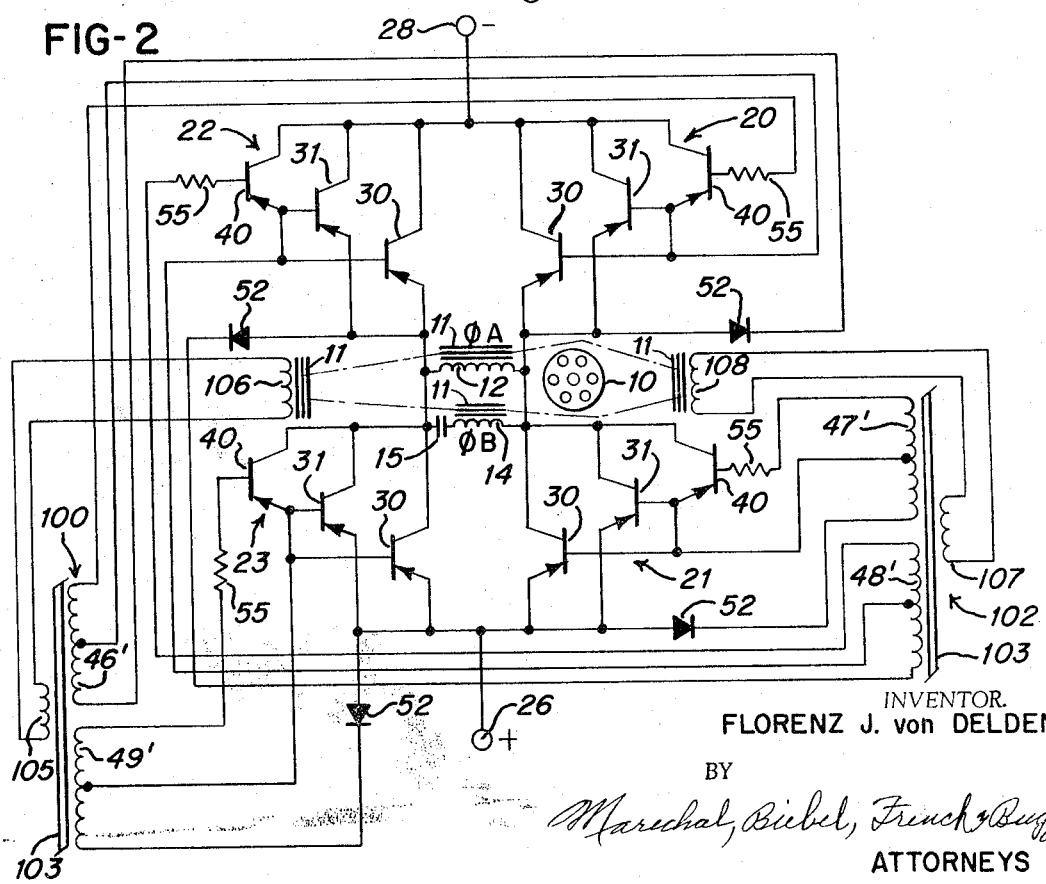
INVENTOR.
FLORENZ J. von DELDEN
BY
*Marechal, Biebel, French & Bugg*
ATTORNEYS

United States Patent Office

3,297,928
Patented Jan. 10, 1967

3,297,928
ELECTRIC MOTORS INCLUDING PLURAL SETS OF WINDING SWITCHES
Florenz J. Von Delden, Glendale, Calif., assignor to The Lau Blower Company, Dayton, Ohio, a corporation of Ohio
Filed Dec. 21, 1964, Ser. No. 419,938
7 Claims. (Cl. 318—138)

This invention relates to electric motors and more particularly to induction motors and control circuits for operating such motors directly from a source of direct current power.

The advantages of induction motors over mechanically commutated motors including relatively longer service life, freedom from mechanical and radio noise due to the commuation, and cleaner operation by reason of the elimination of the mechanical commutator parts. However, induction motors which have been operated by a direct current supply have usually employed a center tapped stator winding. The electrical halves of the stator winding have been alternately applied to the direct current source by a suitable current control or switching device. Transistor circuits have been found to be highly satisfactory for this purpose. However, such motor drive or switching circuits have the disadvantage that only one half of the center tapped stator winding conducts at any given time and, accordingly, the winding must be formed so that each half has the required number of turns in order to produce the desired flux and switching rate.

While such motors and drive circuits are highly satisfactory in many instances, the torque which can be produced by alternately energizing the center tapped stator winding from a direct current source is approximately one-half of the torque produced by the same motor when sine wave A.C. is applied across the entire stator winding. Such arrangements thus have a redundancy when operated on direct current consisting of one of the halves of the center tapped stator winding.

It is therefore an important object of this invention to provide an induction motor and a control or drive circuit for such motor for operation from a direct current source in which the entire stator winding is utilized and which has no need for a center tap on the stator winding.

A further important object of this invention is the provision of a switching circuit for operating an induction motor from a source of low voltage direct current power in which the direct current is switched in relation to the entire stator winding, and in which the direct current applied alternately across the entire winding rather than across halves of the winding.

Another object of this invention is the provision of a two-phase induction motor and control circuit for direct operation from a source of direct current power in which square wave direct current is applied across the full stator windings.

A further object of this invention is the provision of an induction motor and drive circuit for operation directly from a low-voltage direct current source characterized by increased efficiency and full utilization of the stator windings.

These and other objects and advantages of the invention will be apparent from the following description, the accompanying drawing and the appended claims.

In the drawings:

FIG. 1 is a schematic diagram of a motor and drive circuit of this invention; and FIG. 2 is a modification of a portion of the control circuit of FIG. 1 showing the use of switching transformers.

Referring to the figures of the drawing, which illustrate preferred embodiments of this invention, a two-phase induction motor is diagrammatically illustrated as having an induction rotor 10 and a stator 11. A phase A winding 12 and a phase B winding 14 are formed on the stator 11. Preferably, the phase windings are balanced, and each double layer series wound. The motor may be wound with any even number of poles according to known induction motor practice. Also, the phase B winding is electrically positioned in the stator slots in phase quadrature with respect to the phase A winding according to two-phase motor practice, and is series tuned with respect to the phase A winding by means of a phase shifting capacitor 15. The purpose of the capacitor 15 is to effect an approximately 90° phase shift with the result that the current in the phase B windings will be substantially in phase with the voltage on the phase A windings when either sine wave A.C. or square wave D.C. is applied across the windings.

The preferred embodiment of this invention is described in terms of a two-phase motor, for which it is particularly suited. However, the teachings of this invention may be applied to other induction motors such as single phase motors for utilizing the full stator windings with need for a center tap.

Control means for switching the stator of the induction motor of this invention for applying square wave direct current alternately across the stator windings 12 and 14 includes a pair of transistor switching circuits for each end or end terminal of the windings 12 and 14. The switching circuits 20 and 21 comprise a first pair of switching circuits connected to one lead of the windings and the switching circuits 22 and 23 comprise a second pair of switching circuits connected to the other lead of the stator windings. The switching circuits 21 and 23, as shown, include a common lead 25 which is connected to the positive terminal 26 of a source of direct current power, while the circuits 20 and 22 include a common lead 27 which is connected to the negative terminal 28. The switching circuit pairs conduct alternately through complementary circuits to apply power from the direct current source across the full stator windings. At any given instant, two of the circuits are in a conducting state while two of the circuits are blocked or cut off. Thus, complementary circuits 21 and 22 will conduct simultaneously to apply the direct current source to the full stator windings while circuits 20 and 23 are blocked. Upon the saturation of the stator core, the switching circuits are reversed and circuits 20 and 23 become conductive and apply the direct current source in the reverse sense to the full stator windings, while the circuits 21 and 22 are blocked.

Preferably, each of the control circuits are indentical in construction, and accordingly the description of circuit 20 herein applies similarly to the circuits 21, 22 and 23 unless otherwise noted. The circuit 20 includes a pair of parallel-connected power transistors 30 and 31. The transistors 30 and 31 are shown as being of the P-N-P-, and the primary purpose in employing a pair of transistors is to avoid the significantly higher cost and lower switching rates of single transitors which are presently capable of handling the required current outputs. However it is within the scope of this invention to use single transistors in lieu of the transitor pairs described herein, where such are satisfactory.

The transistors of each of the pairs 30 and 31, as well as the cooperating transistors in thte complementary circuits, are preferably chosen to have comparable Beta, to prevent unbalance. The emitters of the transistors 30 and 31 are connected in common and to one terminal 36 of the stator 11. The collectors are also connected in common at the lead 27 and to the negative terminal 28 of the power supply. The same general connecting conditions applies to the circuit 22 except that the emitters of the power transistors are connected to the opposite terminal 37 of the stator windings. In the case of the circuits 21 and 23, the emitters of the power transistors are connected to the positive terminal 26 while the collectors are connected, in the case of the circuit 21 to the stator terminal 36, and in case of the circuit 23 to the stator terminal 37.

It is therefore seen that the circuits 20 and 23 form complementary circuits which provide for conduction through the stator windings in one direction, while the circuits 21 and 22 form a second pair of complementary circuits which provide for conduction through the stator winding in the opposite direction. Also, the circuit pairs 20 and 21 may be considered as a first pair of drive transistor means having a common connection with one end of the stator windings and adapted for connection across the direct current power source while the circuits 22 and 23 may be considered as having a second pair of drive transistor means forming a common connection with the other ends of the stator winding and also adapted for connection across the power source.

The power transistors 30 and 31 which are normally available for this purpose are relatively low in impedence, and this can be a source of difficulty in starting the switching operation, particularly at low temperatures, where the inherent leakage currents are low. Also, transistor gain decreases with temperature. Thus, each of the switching circuits of this invention includes a high impedence drive for the power transistors which assures starting under all conditions. This includes a single P-N-P driving transistor 40 which has its emitter directly connected to the bases of the power transistors 30 and 31, while its collector is connected in common with those of the power transistors. The direct connection of the drive transistor 40 to control the base current of the power transistors, as shown, provides a control circuit which is characterized by relatively high gain and reliable starting at low temperatures. Reference may be had to the patent to Darlington 2,663,806, issued December 22, 1953, for a more detailed description of such a high impedennce drive circuit.

The switching of the complementary circuits 20-23 and 22-21 is controlled by a means of separate control or oscillator windings, there being one such winding for each of the circuits. Accordingly, the circuit 20 is provided with a control winding 46, the circuit 21 with a winding 47, the circuit 22 with a winding 48 and the circuit 23 with a winding 49. Preferably, each of the control windings are balanced to provide balanced operation. The control windings, in the embodiment of FIG. 1, are magnetically associated with the stator 11 to respond to the changes in flux within the stator. Preferably, the control windings in this embodiment are wound on the stator in the slots with the phase A winding 12, and accordingly respond to the changes in flux in the stator as effected by the phase A winding.

Each of the control windings is center tapped and connected by the lead 50 to the common bases of the power transistors 30 and 31. One lead of the control winding is connected to the common emitters through a back biasing diode 52, and the other lead is connected to the base of the high impedence drive transistor through a relatively low value resistor 55. The diode 52 achieves a back biasing voltage during the off cycle of the circuit 20 so that no collector current flows during cutoff. The resistor 55 is a current limiting resistor, and may be varied to effect a degree of control of the speed of the motor.

The control windings 47, 48 and 49 are constructed similarly to that described in connection with the winding 46 and include similar diodes 52 and resistors 55 for the reasons given above. The complementary pairs of control windings 46-49 and 47-48 are arranged with respect to the stator in flux additive relation so that the associated complementary circuits conduct and are cut off together, simultaneously with reversals of flux in the stator 11.

In the operation of the embodiment shown in FIG. 1, any slight existing unbalance in the circuit together with the leakage of the transistors will cause initiation of oscillation. For example, the signal applied by the winding 47 of circuit 21 and the winding 48 of circuit 22 may drive each of these switching circuits into conduction in the saturated mode. Accordingly, current flows from the positive lead 26 through the circuit 21 and through the stator windings to the circuit 22 and to the negative lead 28, considering the flow of current in the conventional sense. This flow will continue and the rate of flux build up within the stator will be in accordance with the magnitude of the voltage, the inductance, and the number of turns on the stator. Reference may be had to the copending application of von Delden, Serial No. 394,468, filed September 4, 1964, which discloses direct current operated motors in which the switching rate, and therefore the motor speed, is controlled by such winding and voltage characteristics.

Upon the saturation of the stator 11, a flux decrease occurs which causes reversal of the currents in each of the control windings and, accordingly, the cutoff of the circuits 21 and 22, and the simultaneous conduction of the complementary pair of circuits 23 and 20. Accordingly, the direct current voltage is switched and applied with opposite polarity across the full stator windings, and this continues at a specified switching rate to drive the motor.

In certain instances, particularly for high speed motors in which the switching must be accurately controlled, a switching transformer may be used. FIG. 2 shows a pair of such transformers 100 and 102, with one transformer being associated with each of the complementary pairs of circuits described above. The transformers 100 and 102 are preferably wound on suitable torodial cores 103 which have square loop hysteresis characteristics.

The transformer 100 has primary winding 105 which is connected in series with an oscillator winding 106 wound on the stator and preferably in the slots with the phase A winding. However, the winding 106 may be removed in some instances, and the primary winding 105 connected electrically directly across the phase A winding. Also, the transformer 102 has a similar primary winding 107 which is connected witth another oscillator winding 108, also preferably wound in the phase A slots.

The transformers 100 and 102 have pairs of secondary windings thereon which are designated in accordance with the control oscillator winding which they replace. Thus, the transformer 100 has secondary windings 46' and 49' corresponding to the complementary control windings 46 and 49 described above, while the transformer 102 incorporated secondary windings 47' and 48' corresponding to the complementary control windings 47 and 48. The practical effect of the embodiment of FIG. 2 is the insertion of a saturable transformer, to provide accurate control of the switching rate. By this means, the switching point can be accurately controlled in relation to the flux density of the stator since the input signal to the primarys of the transformer 100 and 102 can be accurately related to the saturation point of the core of the switching transformer in relation to the flux density of the stator, resulting in an accurately timed signal applied to the complementary switching circuits.

It will therefore be seen that this invention provides an induction motor and control circuit in which the full stator windings are utilized during each half cycle of conduction. Such motors have been found to have torque characteristics which very nearly equal the torque when the motor is operated directly across sine wave A.C. of the same R.M.S. voltage. The invention permits the use of windings which do not lend themselves readily to center taps and results in motor designs which are both compact and efficient, utilizing all of the copper in the stator rather than only part of the copper at any given instant.

While the forms of apparatus herein described constitute preferred embodiments of the invention, it is to be understood that the invention is not limited to these precise forms of apparatus, and that changes may be made herein without departing from the scope of the invention which is defined in the appended claims.

What is claimed is:

1. An induction motor for operation directly from a source of direct current power, comprising a stator winding with an electrical connection at each end thereof, means forming pairs of controllable transistor switching circuits with a separate pair thereof connected at each end of said winding and each of said circuits of said circuit pairs having a power transistor arranged to conduct through said winding in one direction through a complementary power transistor in one of the circuits of the other of said pairs connected to the opposite terminal of said winding, means connecting said circuit pairs across said direct current power source, and control means for said transistor circuit pairs to effect alternate conduction and cutoff of the power transistors thereof including a separate input transistor and control winding for each of said switching circuits responsive to flux reversals in said stator and connected to control the bases of said power transistors for effecting alternate conduction and blocking of said power transistors in said circuit pairs for applying said direct current source to the entire stator winding first in one direction and then in the other.

2. An induction motor and drive circuit comprising a stator winding, a source of direct current power, a first pair of drive transistors having a common connection with one end of said stator winding and adapted for connection across said direct current power source, a second pair of drive transistors forming a common connection with the other end of said stator winding and also adapted for connection across said power source, a separate high impedance input transistor connected in driving relation to the bases of each of said transistors of said transistor pairs, and control means for each of said high impedance input transistors for effecting alternate conduction and blocking of the transistors comprising one of said pair of drive transistors in oppositely timed relation to the transistors comprising the other of said pair of drive transistors for effecting conduction from said source through the entire said stator winding first in one direction and then in the other.

3. A two-phase induction motor and drive circuit comprising a phase A winding, a phase B winding, a phase shifting capacitor in series with said phase B winding, said phase B winding and said capacitor having common end terminals with said phase A winding, a stator winding, a source of direct current power, a first pair of drive transistors having a common connection with one said end of said stator windings and adapted for connection across said direct current power source, a second pair of drive transistors forming a common connection with the other end terminal of said stator windings and also adapted for connection across said power source, a separate high impedance input transistor connected in driving relation to the bases of each of said transistors of said transistor pairs, and control means for each of said high impedance input transistors for effecting alternate conduction and blocking and in timed relation of one pair of the transistors comprising said first pair of drive transistors in oppositely timed relation to the transistors comprising the other pair of drive transistors.

4. A motor drive circuit for operating an induction motor from a source of direct current power comprising a first set of two current controlling transistor circuits connected to one terminal of the stator winding of said motor, one circuit of each of said first set being operable to provide current flow from said source through said stator winding in one direction and the other circuit of said first set being operable to provide current flow through said winding in the opposite direction, a second set of two current controlling transistor circuits connected to the other terminal of said stator winding with each circuit of said second set being operable to provide current flow from said source through said stator winding in a different direction through one of the circuits of said first set forming with said first set complementary pairs of said circuits, each of said circuits having a high impedance input transistor with its emitter-collector electrodes connected to control the conduction and cutoff of its associated said circuit, control windings responsive to the occurrence of saturation of said stator core, and means connecting the base electrodes of said input transistors to said control windings for effecting alternate conduction of said complementary circuit pairs in timed relation with the occurrence of saturation of said stator for effecting direct current flow from said source through the entire said stator winding first in one direction and then in the other direction.

5. An induction motor for operation directly from a source of low voltage direct current power, comprising a stator winding having electrical connections at each end thereof, drive means for said stator winding including four controllable transistor switching circuits with two of said circuits being connected at each end of said stator winding forming circuit pairs with each circuit in said pair being arranged to conduct electricity through said stator winding in a different direction through a complementary circuit in the other circuit pair when said circuit pairs are connected across said source of direct current power, and control means for each of said transistor circuits for effecting conduction and cutoff thereof in timed relation in response to the flux saturation of the motor stator with complementary said circuits being controlled together including a separate control winding for each of said circuits responsive to flux reversals in the motor stator and connected to control the conduction and cutoff of the associated said transistor circuit.

6. The motor of claim 5 wherein said control windings are received directly in the slots with said stator winding.

7. The motor of claim 5 further comprising a pair of switching transformers for each of said complementary circuits and each having a generally square-loop hysteresis characteristic with a primary winding thereon responsive to flux conditions in said motor stator, and wherein said control windings comprise secondary windings on said transformers.

References Cited by the Examiner

UNITED STATES PATENTS

| | | | |
|---|---|---|---|
| 3,131,341 | 4/1964 | Kniazeff | 318—138 |
| 3,153,185 | 10/1964 | Hummel | 318—138 X |
| 3,175,167 | 3/1965 | Lloyd | 331—113 |
| 3,181,046 | 4/1965 | Sutton | 318—345 X |
| 3,206,695 | 9/1965 | Bennett | 331—113 X |
| 3,229,179 | 1/1966 | Hetzel | 318—138 |

ORIS L. RADER, *Primary Examiner.*

G. SIMMONS, *Assistant Examiner.*

UNITED STATES PATENT OFFICE

CERTIFICATE OF CORRECTION

Patent No. 3,297,928                  January 10, 1967

Florenz J. Von Delden

It is hereby certified that error appears in the above numbered patent requiring correction and that the said Letters Patent should read as corrected below.

Column 1, lines 50 and 51, for "current applied" read -- current is applied --; column 5, line 67, strike out "and in timed relation of one pair"; column 6, line 2, after "transistors" and before the period, insert -- for effecting application of said source to the full said stator windings first in one direction and then in the other direction --.

Signed and sealed this 7th day of November 1967.

(SEAL)
Attest:

Edward M. Fletcher, Jr.                    EDWARD J. BRENNER
Attesting Officer                         Commissioner of Patents